United States Patent [19]

Adelson et al.

[11] Patent Number: 5,506,792
[45] Date of Patent: *Apr. 9, 1996

[54] SYSTEM FOR OPERATING APPLICATION SOFTWARE IN A SAFETY CRITICAL ENVIRONMENT

[75] Inventors: Alexander M. Adelson, Peekskill, N.Y.; Alan J. Eisenberg, Monmouth Junction, N.J.; Richard J. Farrelly, Wayne, Pa.

[73] Assignee: Base 10 Systems, Inc., Trenton, N.J.

[*] Notice: The term of this patent shall not extend beyond the expiration date of Pat. No. 5,339,261.

[21] Appl. No.: 387,310

[22] Filed: Feb. 27, 1995

Related U.S. Application Data

[63] Continuation of Ser. No. 230,038, Apr. 19, 1994, which is a continuation of Ser. No. 964,742, Oct. 22, 1992, Pat. No. 5,339,261.

[51] Int. Cl.⁶ ............................................. G06F 15/177
[52] U.S. Cl. ........................... 364/570; 364/550; 395/650; 395/700
[58] Field of Search ............................ 364/570, 551.01, 364/550; 395/650, 700, 500; 371/16.5, 24, 29.1

[56] References Cited

U.S. PATENT DOCUMENTS

| | | | |
|---|---|---|---|
| 4,253,145 | 2/1981 | Goldberg | 364/200 |
| 4,412,280 | 10/1983 | Murphy et al. | 364/200 |
| 5,063,500 | 11/1991 | Shorter | 395/200 |
| 5,063,527 | 11/1991 | Price et al. | 364/550 |
| 5,179,702 | 1/1993 | Spix et al. | 395/650 |
| 5,245,615 | 9/1993 | Treu | 371/16.5 |
| 5,339,261 | 8/1994 | Adelson et al. | 364/570 |
| 5,355,487 | 10/1994 | Keller et al. | 395/650 |

OTHER PUBLICATIONS

Loucks et al., "Saving The Day", Unix Review, V7, N 1, p. 40 (7), Jan., 1989.

*Primary Examiner*—Emanuel T. Voeltz
*Assistant Examiner*—Patrick J. Assouad
*Attorney, Agent, or Firm*—Sprung Horn Kramer & Woods

[57] ABSTRACT

A system and method for operating application software in a safety critical environment comprises providing a data processor having an operating system for effecting processing operations and an intermediate shell which interacts with the operating system and application software to emulate a safety critical environment to the application software. The application software is run by interacting solely with the intermediate shell to effect a safety critical environment therefor.

13 Claims, 2 Drawing Sheets

SYSTEM FOR OPERATING APPLICATION SOFTWARE IN A SAFETY CRITICAL ENVIRONMENT

This application is a continuation of application Ser. No. 08/230,038, filed Apr. 19, 1994, which is a continuation of application Ser. No. 07/964,742, filed Oct. 22, 1992 and now U.S. Pat. No. 5,339,291.

BACKGROUND OF THE INVENTION

The present invention relates to a system and a method for operating application software in a safety critical environment. A safety critical environment is one in which a computer software activity (process, functions, etc.) whose errors such as inadvertent or unauthorized occurrences, failure to occur when required, erroneous values, or undetected hardware failures can result in a potential hazard, or loss of predictability of system outcome. A safety critical environment is necessary for safety critical computer software components wherein an inadvertent action might be directly responsible for death, injury, occupational illness, or significant operation, or where the results of a computer action would be relied on for decisions which might cause death, injury, or a significant action. A safety critical environment is a common set of standards or understandings and is addressed in military specifications such as MIL-STD-882B, which acts in concert with software which is developed under DOD-STD-2167, and DOD-STD-2168. Additionally, the ability to review and audit the operations of the computer program, after completion of its execution, to insure compliance becomes a part of the safety critical environment.

Heretofore, special purpose computers have been designed wherein the hardware and firmware built into the system are specially made to provide all of the performance, testing and reporting requirements to provide a safety critical environment for application software.

However, as government agencies such as the Food and Drug Administration, impose safety critical standards on existing medical systems, along with the requirement to validate the software development process, and the correct performance of the software when used in a safety critical operation, there is a need for providing a safety critical environment embedded within general purpose data processing systems such as those having standard commercial operating systems such as DOS, system 7 for Macintosh, Windows, OS/2, etc. This safety critical environment would also be responsible for monitoring and verifying of correct operation to permit demonstratable evidence of application system functioning.

SUMMARY OF THE INVENTION

The main object of the present invention is to provide a safety critical environment in a data processing system which is normally not capable of providing a safety critical environment and which operates with an industry standard operating system for a personal computer.

These and other objects of the present invention are achieved in accordance with the present invention by an intermediate operating shell that is superimposed on a standard personal computer operating system such as DOS, the System 7 operating system for the Macintosh, Windows, OS/2, etc. The function of the intermediate shell is to emulate a safety critical environment for a personal computer which is normally not a safety critical system, monitoring its performance integrity as a safety critical instrument. The shell interacts with the operating system to watch all system functions for safety critical performance deviations and either corrects them in real time or stops the system from proceeding, along with an on the spot reporting function. The shell also has the function of interacting with application software so that the application software does not have to interact with the normal operating system. Thus the intermediate shell provides a standard and consistent operating environment for the application software which will inherently conform to the requirement of a safety critical environment.

In accordance with the present invention, the intermediate shell is superimposed on the operating system to emulate a safety critical data processing system. The intermediate shell preferably defines a uniform machine to application software which supports common database operations and structures and common screen handling capabilities.

Some of the characteristics of the safety critical operation which are carried out by the intermediate shell are the performing of database integrity checking with each read and write into a database, range checking, continuous checking of the hardware and problem logging. The intermediate shell also carries out the safety critical characteristics of redundancy by double copy comparing of all data or equivalent techniques, database information validation by cyclic redundancy checks on all data elements, hardware validation and variable data validation including range testing and format testing.

Another important feature of the present invention is that the shell runs the application software in the foreground and then continuously checks the hardware and the integrity of the database in the background where it is transparent to the user.

These and other features and advantages of the present invention will be seen from the detailed description of the invention taken with the attached drawings, wherein:

DETAILED DESCRIPTION OF THE INVENTION

Figure 1:
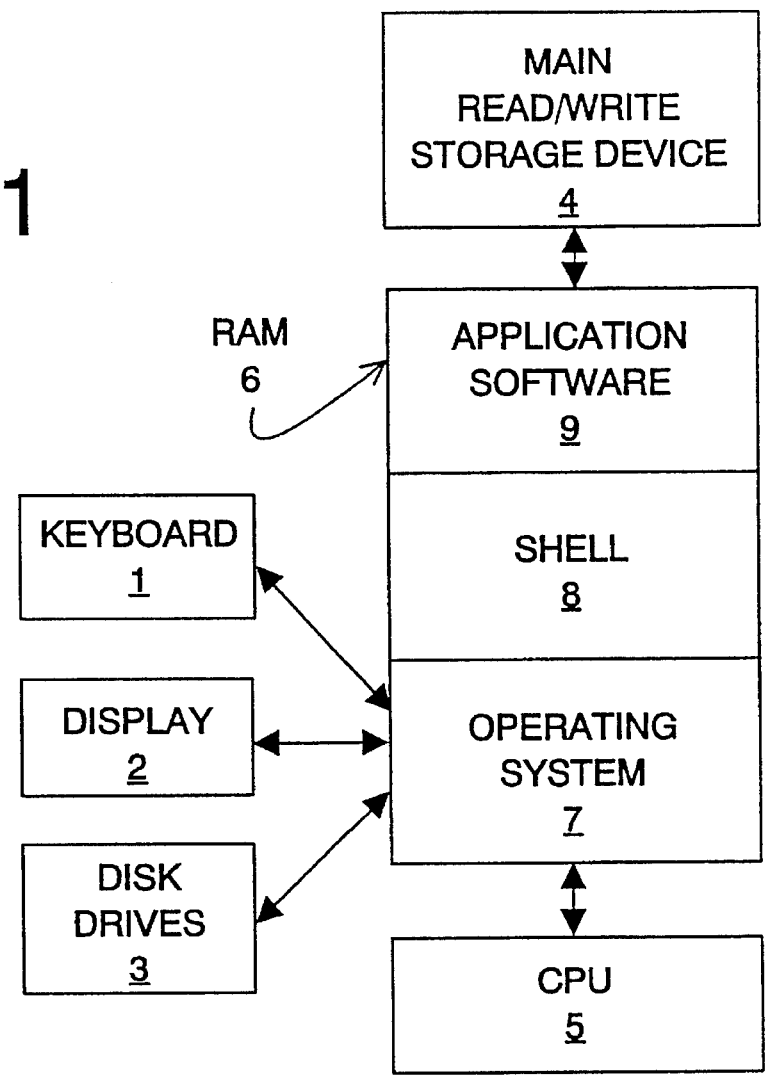
FIG. 1 is a block diagram of the system according to the present invention.
Figure 2:
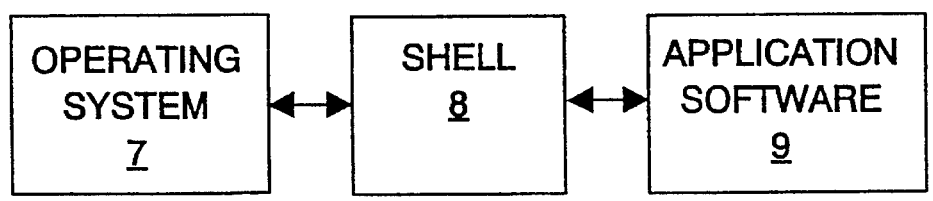
FIG. 2 is a block diagram of the interaction between the operating system, the shell and application software.

Referring to FIG. 1, a system for operating application software in a personal computer typically includes a keyboard 1, a display 2 such as a monitor, disk drives 3, a main read/write storage device 4 typically constituted by a hard drive, a CPU 5 such as an Intel 386 processor and RAM 6. The operating system 7 can be normally stored in main storage device 4 or can be loaded via a disk drive 3, or may be part of the firmware of the system and be stored in a ROM as part of the CPU 5. In FIG. 1, the operating system is shown as being loaded into RAM 6 and the operating system functions to control the interaction between the keyboard, display, disk drives and main memory and the CPU. Many operating systems are available for personal computers, including DOS, OS/2, Windows and the System 7 operating system for the Macintosh computers.

In a typical computer, application software 9 is loaded into RAM and interacts with the operating system to carry out the particular application. However, conventional personal computers do not provide a safety critical environment in conformance with military specification MIL-STD-882B.

Thus in the present invention, an intermediate shell 8 is provided which is preferably loaded into RAM from the main memory or may be contained in a ROM as part of CPU 5 and which is superimposed on the operating system 7 to interact with the operating system and which emulates a safety critical environment to application software 9 which interacts solely with the shell 8.

For example, where the application software is medical software which draws diagnostic conclusions from input data, the application software will interact solely with the shell 8 which in turn interacts with the operating system 7 to provide all of the safety critical characteristics that are required for the application software 9.

Figure 3:
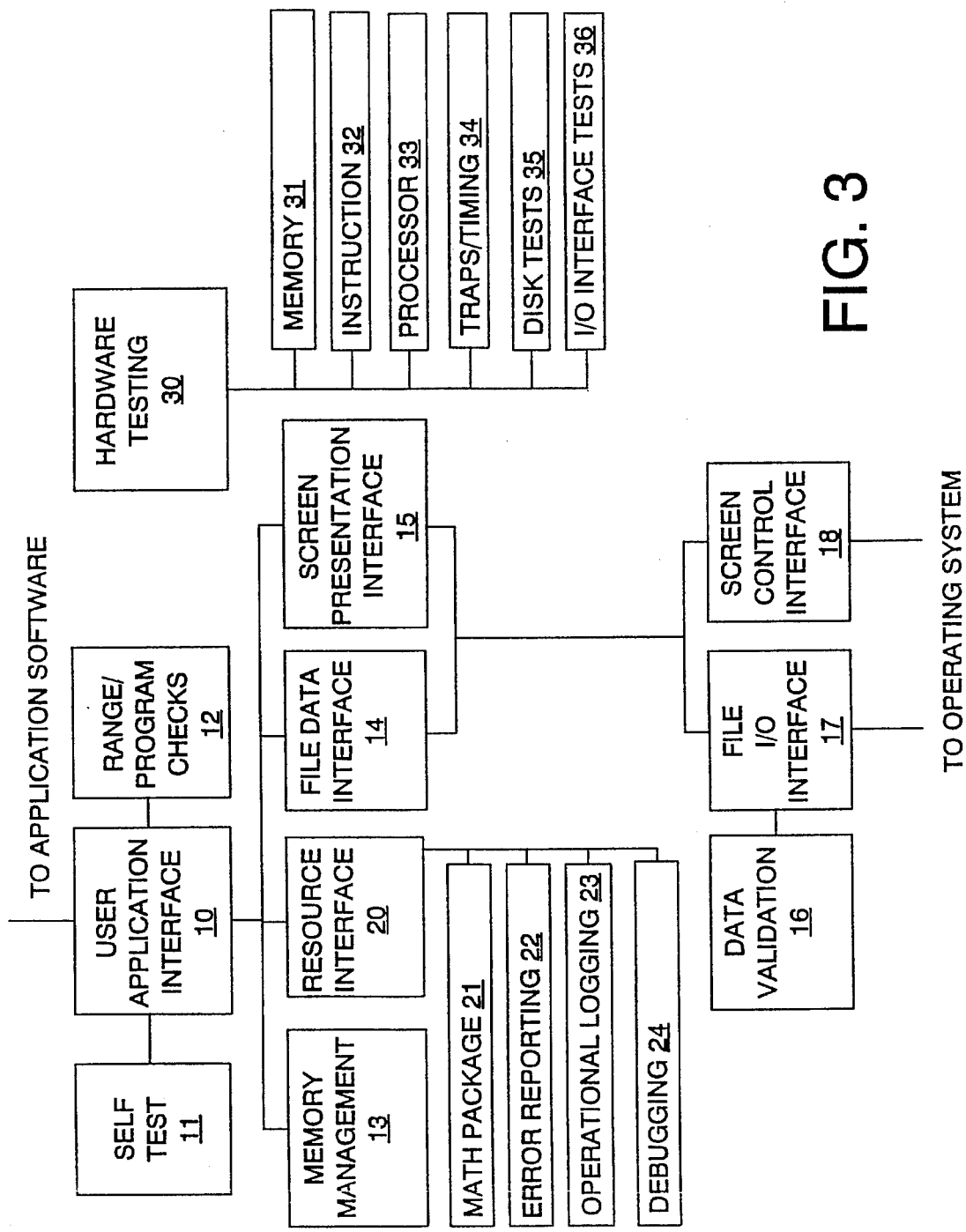
FIG. 3 is a block diagram of the functions of the intermediate shell of FIGS. 1 and 2.

The functions of the intermediate shell 8 are shown in the block diagram of FIG. 3. As shown therein, the shell has various functional blocks which carry out the emulation of a safety critical environment by interacting with the operating system.

Specifically, the shell has a user application interface which interacts with the applications software and is the sole interaction with the application software during its use. The user application interface 10 has a self-testing section which acts to make sure that the shell itself is operating properly and performs range and program checks 12 on the application software to check its integrity. The user application interface operates in the foreground, whereas all of the other safety critical environment functions are operated in the background so that they are transparent to the user.

The user application interface 10 interacts with a memory management section 13, a file data interface 14 and a screen presentation interface 15 as well as a resource interface 20.

The resource interface controls a math package which insures that the accuracy of the system is sufficient for the particular application and the requirements of the software critical environment. Thus where typical accuracy is 8 bits, the math package 21 can provide up to 32 bits or more of accuracy if necessary. The error reporting section 22 provides an on the spot report of any error detected by the shell which is emulating the safety critical environment. The operation logging section 23 keeps a record of all checking carried out by the shell which can then be accessed from memory at a later time. Finally, the debugging section 24 acts to attempt to remove errors when recognized by the shell.

The shell also includes the file input/output interface 17 which interacts with the operating system to send and receive data from memory. The data validation section 16 performs the double copy compares for each read and write to the memory. The screen control interface 18 also interacts with the operating system and controls all data sent to the screen or display to insure that the display is accurate under the conditions of a safety critical environment.

The shell further includes a hardware testing section 30 which performs continuous hardware checking and validation. The hardware testing section 30 includes a section 31 for testing memory, and performs a cyclical redundancy check on all data elements in memory. Section 32 checks the integrity of the instruction registers and section 33 checks the integrity of the processor in the system to insure that it is operating properly. The section 34 checks the traps and timing including the system clock to make sure they are operating correctly, section 35 tests disks and section 36 tests the I/O interface.

In use, the user application interface 10 will interface all other facilities to the application software. The application software will request mathematical calculations, data read and/or write, activity logging or screen presentation and action initiation when a screen choice is made. The application software will be most advantageously created by a development system so as to make requests for action to the shell. The requests are accepted by the user application interface which then transfers the requests to the proper operating process within the shell along with any required logging or checking action. Responses to the requested operation are returned by the user application interface 10 to the application software.

For example, if there is a request to write a record to a file, this would cause the record to be transferred to operational logging 23 and to the file I/O interface 17. Additionally, the debugging section 24 is activated and the contents of the write are analyzed to determine if it contains the desired data.

The self test 11 performs testing of the shell itself. It causes sanity checks with each of the other processes through a defined protocol of information transfer and performs a cyclical redundancy check over the memory space occupied by the shell. This process performs its operations as frequently as required by the level of safety criticality for the particular application software. Thus, the greater the level of safety criticality, the more frequently the self-testing would be performed.

The range/program checks 12 perform data verifications of range, field type, etc. on data that is operated on by the mathematical package 21 where data sent to or retrieved from the file I/O interface 17 and screen control interface 18. Additionally, this verifies the section of the application software accessed by the memory management 13 by a cyclical redundancy check and by size validation.

The memory management 13 acquires the application code and validates it using the range/program checks 12. It then logs its initiation in operational logging 23 and starts the application. For application sections keyed to screen responses, this process will acquire those sections and validate them prior to execution.

The file data interface 14 translates generic data read/write requests into the file activities contained in the file I/O interface 17 associated with the actual operating system under which the program is executing. For example, when the application software requests the reading of a record in a database with a specific key, it will have that request translated to a series of commands required by an active random access keyed database program.

The screen presentation interface 15 translates a generic screen layout containing response keys and fields into the screen presentation activities contained in the screen control interface 18 associated with the actual operating system under which the software is executing. Thus, a screen layout containing radio buttons or fields to be entered or selection buttons or action buttons is described by the application and is then translated into a series of commands required by the active user interface methodology.

The data validation 16 adds a cyclical redundancy check to every written record and validates every record read. It controls information to insure the data has not been modified or accidentally destroyed.

The file I/O interface 17 performs the actual calls to the operating system for reading and writing to the main storage device. This will handle all random, keyed and sequential accessing of data and all formatting of the generic records into system dependent record requests. Additionally, the file I/O interface uses the data validation 16 to validate the data read and written to insure that data failures are recognized.

The screen control interface 18 performs the actual calls to the operating system for presenting screen displays to the system user and for receiving response inputs from the user. This handles the formatting of the generic screen and its presentation elements, such as radio buttons, menu selections, data fields, etc. which are compatible with the system's presentation method.

The resource interface 20 controls access to a set of capabilities offered by the shell and which supports the application operations. These capabilities include the math package 21, which supports statistical calculations and multiple accuracy calculations and insures that accuracy levels are consistent among all systems for application calculations that require specific calculation tolerances. The error reporting 22 defines the method of reporting the shell determined errors. The operation logging 23 logs all desired activities and errors, and the debugging 24 allows application programs to define data conditions or error conditions and requests identification of where and when they occur, for aiding and determining problems with the application software.

The math package 21 offers a system independent set of math routines, which will support statistical operations and calculations requiring accuracy levels which are different with different platforms. The error reporting 22 passes all errors encountered and reports them to either the operational log 23 and/or the user in a consistent manner. The operational logging 23 generates an activity log which includes what program was executing or which segment of the program was executing, data record modifications and/or access, screen presentations and operator responses, etc. This log is used for review by the user application of daily activities or can be used by a governing agency for verification of proper operation of a designated application. A special signature can be recorded with the records to insure that the records have not been tampered with. The debugging 24 allows a user set of criteria to be applied to dynamic operations of the application software in order to aid in identifying problems with the application. These are recognition of incorrect data being written or read from the main storage device, or a request for an incorrect screen presentation sequence.

The hardware testing 30 is an activity that occurs independently of the application software. The testing takes place on a time available basis to insure that the platform in which the application is operating is operating correctly. This includes a series of tests which verify the normal processing of the system and the integrity of the connected hardware.

The hardware testing includes memory testing 31 which insures that the RAM memory can be read and written with reliable retrieval of stored data. This operates in a non-destructive mode to insure no interference with program operation. Instruction testing 32 tests each of the processor instructions in various orientations with known operantes and compares the results of the operation with expected results in order to verify proper operation of the CPU and to insure proper execution of the program. The processor testing 33 checks the processor dependent operations to also insure proper execution of a program. These operations involve special capabilities of each unique processor. Traps/ timing testing 34 checks the clock timing and interrupt actions wherever possible on a non-interference basis to insure that timed activities and interrupt driven activities are operating properly. Disk testing 35 checks the hard drive or main storage device controller and drives on a non-interference basis to insure that disk read, disk write, and seek operations are operating properly. The input/output interface tests 36 check all input/output interface boards which are unique to the user application and are thus dependent on the specific hardware installed in the system.

It will be appreciated that the instant specification and claims are set forth by way of illustration and not limitation and that various modifications and changes may be made without departing from the spirit and scope of the present invention.

What is claimed is:

1. An intermediate shell for use in a system for running application software in a safety critical environment, comprising: means for interfacing with an operating system, means for interfacing with application software to run the application software under the operating system through the intermediate shell and means for controlling both foreground and background safety critical functions while the application software is running including means for testing the intermediate shell as a background safety critical function independent of and while the application software is running in conjunction with the operating system.

2. The shell according to claim 1, further comprising means for continuously monitoring operations of a memory, a clock and a processor as a background safety critical function while the application software is running and means for indicating an error in operations of the clock, memory and processor as a foreground safety critical function.

3. The shell according to claim 1, further comprising means for continuously monitoring input data and operations of a memory, a clock and a processor as a background safety critical function while the application software is running to produce chronological event data corresponding to said operations and means for maintaining a log of the input data and the chronological event data as a background safety critical function.

4. The shell according to claim 1, further comprising means for storing ranges and formats for input data, output data and calculated data for the application software, means for continuously comparing input data, output data and calculated data with the stored ranges and formats as a background safety critical function while the application software is running and means for indicating an unfavorable comparison as a foreground safety critical function.

5. An intermediate shell for use in a system for running application software in a safety critical environment, comprising: means for interfacing with an operating system, means for interfacing with application software running under the operating system to receive application software defined error conditions from the application software and means for controlling both foreground and background safety critical functions in accordance with the application software defined error conditions while the application software is running.

6. The shell according to claim 5, further comprising means for testing the intermediate shell as a background safety critical function independent of and while the application software is running in conjunction with the operating system.

7. The shell according to claim 5, further comprising means for continuously monitoring operations of a memory, a clock and a processor as a background safety critical function while the application software is running and means for indicating an error in operations of the clock, memory and processor as a foreground safety critical function.

8. The shell according to claim 5, further comprising means for continuously monitoring input data and operations of a memory, a clock and a processor as a background safety critical function while the application software is running to produce chronological event data corresponding to said operations and means for maintaining a log of the input data and the chronological event data as a background safety critical function.

9. The shell according to claim 5, further comprising means for receiving application software defined data conditions and means for continuously comparing data with the received application software defined data condition as a background safety critical function while the application software is running.

10. An intermediate shell for use in a system for running application software in a safety critical environment, comprising: means for interfacing with an operating system, means for interfacing with application software running under the operating system to receive application software defined data conditions from the application software and means for controlling both foreground and background safety critical functions in accordance with the application software defined data conditions while the application software is running.

11. The shell according to claim 10, further comprising means for testing the intermediate shell as a background safety critical function independent of and while the application software is running in conjunction with the operating system.

12. The shell according to claim 10, further comprising means for continuously monitoring operations of a memory, a clock and a processor as a background safety critical function while the application software is running and means for indicating an error in operations of the clock, memory and processor as a foreground safety critical function.

13. The shell according to claim 10, further comprising means for continuously monitoring input data and operations of a memory, a clock and a processor as a background safety critical function while the application software is running to produce chronological event data corresponding to said operations and means for maintaining a log of the input data and the chronological event data as a background safety critical function.

\* \* \* \* \*